United States Patent [19]
Sasaki et al.

[11] Patent Number: 5,805,192
[45] Date of Patent: Sep. 8, 1998

[54] IMAGE FORMING APPARATUS HAVING AUTOMATIC IMAGE DENSITY ADJUSTMENT FUNCTION AGAINST DOT SIZE VARIATION

[75] Inventors: Eiichi Sasaki, Sagamihara; Kouichi Irie, Tokyo, both of Japan

[73] Assignee: Ricoh Company, Ltd., Tokyo, Japan

[21] Appl. No.: 715,613

[22] Filed: Sep. 18, 1996

[30] Foreign Application Priority Data

Sep. 18, 1995 [JP] Japan .................................. 7-263604
Sep. 2, 1996 [JP] Japan .................................. 8-231978

[51] Int. Cl.$^6$ .......................... B41J 2/385; G03G 13/04
[52] U.S. Cl. ...................... 347/131; 347/133; 347/246
[58] Field of Search .................................. 347/133, 131, 347/129, 246, 252; 399/46, 55, 56, 64, 138, 181, 235; 358/456, 459, 298

[56] References Cited

U.S. PATENT DOCUMENTS

| | | | |
|---|---|---|---|
| 5,237,370 | 8/1993 | Murai | 399/49 |
| 5,486,901 | 1/1996 | Tukuchi et al. | 399/40 |
| 5,499,370 | 3/1996 | Hosaka et al. | 395/672 |
| 5,579,090 | 11/1996 | Sasanuma et al. | 399/49 |

*Primary Examiner*—N. Le
*Assistant Examiner*—L. Anderson
*Attorney, Agent, or Firm*—Oblon, Spivak, McClelland, Maier & Neustadt, P.C.

[57] ABSTRACT

An image forming apparatus which automatically adjusts an image density when at least one of conditions of an optical writing operation, including a size of a dot image, a light strength of a laser beam, a mode of image resolution, and a scanning speed of the laser beam, is changed. When an instruction by an operator for changing the conditions of the optical writing operation is input, an optical writing controller executes a change of the conditions and a process controller then executes an operation of determining a development potential and associated bias potentials on the basis of the changed conditions of the optical writing operation. In the operation of determining a development potential and associated bias potentials, a predetermined reference dot image is written on a photoconductor by a laser beam under the changed condition of the optical writing operation and is developed with color toner under the determined development potential and associated bias potentials. The created reference dot image is then measured by a photosensor to calculate a degree of image density. On the basis of the measurement of the image density, the determined development potential and associated bias potentials are corrected to be appropriate.

28 Claims, 17 Drawing Sheets

IMAGE FORMING APPARATUS HAVING AUTOMATIC IMAGE DENSITY ADJUSTMENT FUNCTION AGAINST DOT SIZE VARIATION

BACKGROUND OF THE INVENTION

1. Field of the Invention

This invention relates to an image forming apparatus, and more particularly to an image forming apparatus having a function for automatically adjusting image density when a size of a dot is changed in accordance with a change of an optical writing condition such as image resolution.

2. Discussion of the Background

An image forming apparatus employing a laser beam writing system for writing a dot image on a photoconductive material in electrophotography is widely used. An advantage of such image forming apparatus or a color image forming apparatus, in particular, is of output image quality mainly brought by the precision laser beam writing system.

When a size of an image is changed on a conventional image forming apparatus employing a laser beam writing system henceforth referred to as a laser printer, image quality may often be degraded mainly due to the fact that a level of image density is not maintained. Such degradation in image quality also occurs when a number of dots per length unit, henceforth referred to as image resolution, is changed on the laser printer. The reason is simply because the laser beam is kept providing a dot of a constant size. This proves that a change of relative distance between dots without changing a size of a dot affects image density. It is therefore desired that a size of a dot formed by the laser beam is changeable in accordance with a change of an image size or a change of an image resolution.

Several solutions for changing a dot size of a conventional laser printer have already been introduced. One example of the solutions teaches that a plurality of lens systems, each having a different magnification, assembled on a revolving base is installed in front of a laser diode so as to change a laser beam spot size. Another example of the solutions teaches to use a zoom lens instead of the above-mentioned revolving lens systems. However, these solutions have introduced other disadvantages such as being optically complex, costly, and relatively inaccurate.

Taking the above problems into consideration, there has been a proposal in which a single lens system having a single focus point is employed and the light strength of a laser beam therethrough is controlled so as to change a laser beam size. This proposal is disclosed in Japanese Laid Open Patent Application TOK KAI SHO 62-49315. By the configuration introduced by this proposal, a dot size can easily be controlled in a relatively simple and inexpensive configuration.

However, the problem still remains particularly on a color image forming apparatus such as a color laser printer even with the above-mentioned solution. Although a dot size is changed in accordance with a change of image size or image resolution, a precise adjustment with respect to image density for each color is found left behind. In other words, when a dot size is changed by changing light strength, it is also necessary to find out the most suitable light strength with which a changed dot size fits to a changed image size and with which appropriate image density results so as to maintain a quality color image.

SUMMARY OF THE INVENTION

Accordingly, an object of the present invention is to provide a novel image forming apparatus having a function for automatically adjusting image density when a size of a dot formed by a laser beam is changed in accordance with a change of an optical writing condition such as image resolution.

In accomplishing this and other objects, there is provided, in accordance with the present invention, an improved image forming apparatus including a laser beam generating circuit, an optical writing controller, an instruction buffer, a process controller, and a system controller.

When an instruction is input by an operator for changing at least one of the conditions of an optical writing operation, including a size of a dot image, a light strength of a laser beam, a mode of image resolution, and a scanning speed of the laser beam, an optical writing controller accordingly executes changing the conditions and a process controller then executes an operation of determining a development potential and associated bias potentials on the basis of the changed conditions of the optical writing operation. In the operation of determining a development potential and associated bias potentials, a predetermined reference dot image is written on a photoconductor by a laser beam under the changed condition of the optical writing operation and is developed with color toner under the determined development potential and associated bias potentials. The created reference dot image is then measured by a photosensor to calculate the image density. On the basis of the measurement of the image density, the determined development potential and associated bias potentials are corrected to be appropriate.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
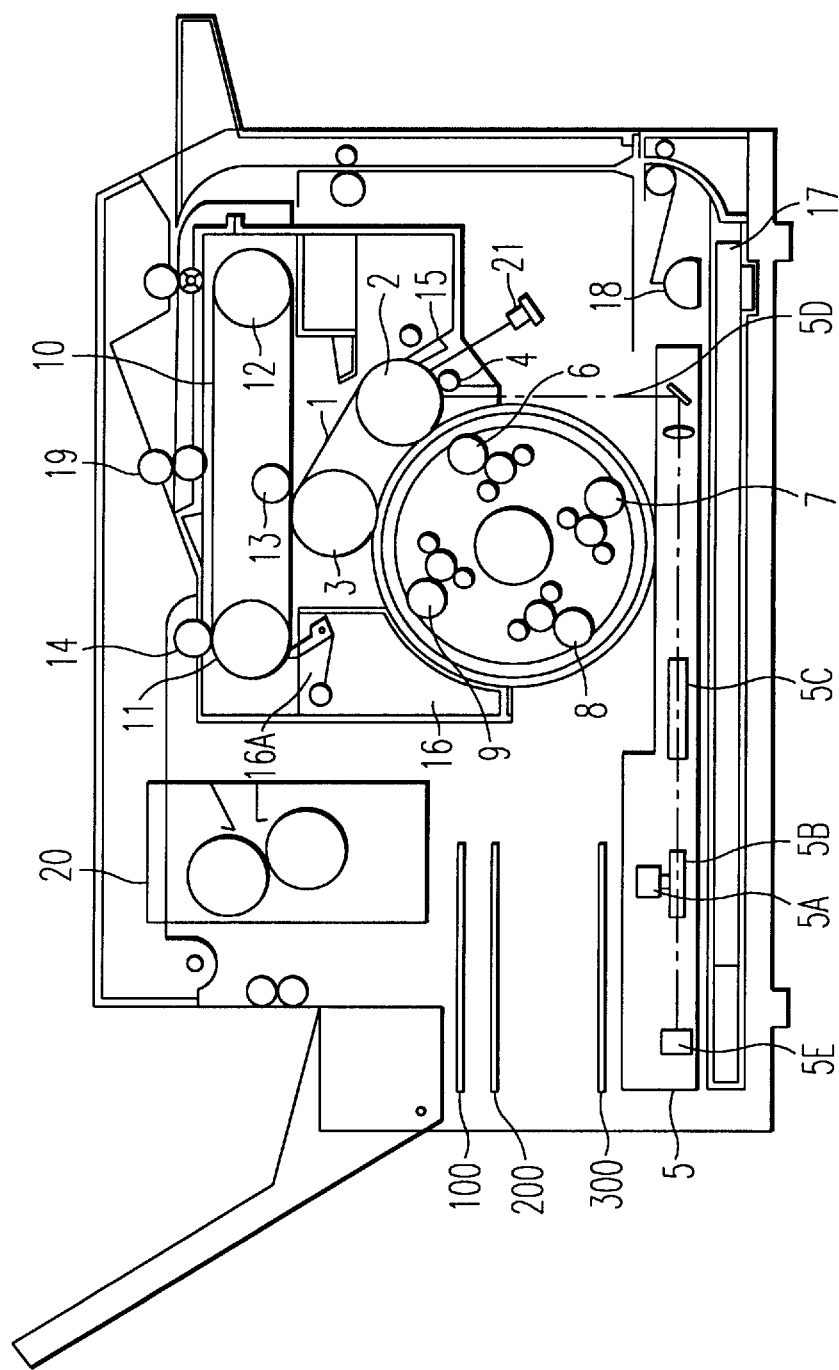
FIG. 1 is a sectional view illustrating a structure of a color image forming apparatus embodying the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 2:
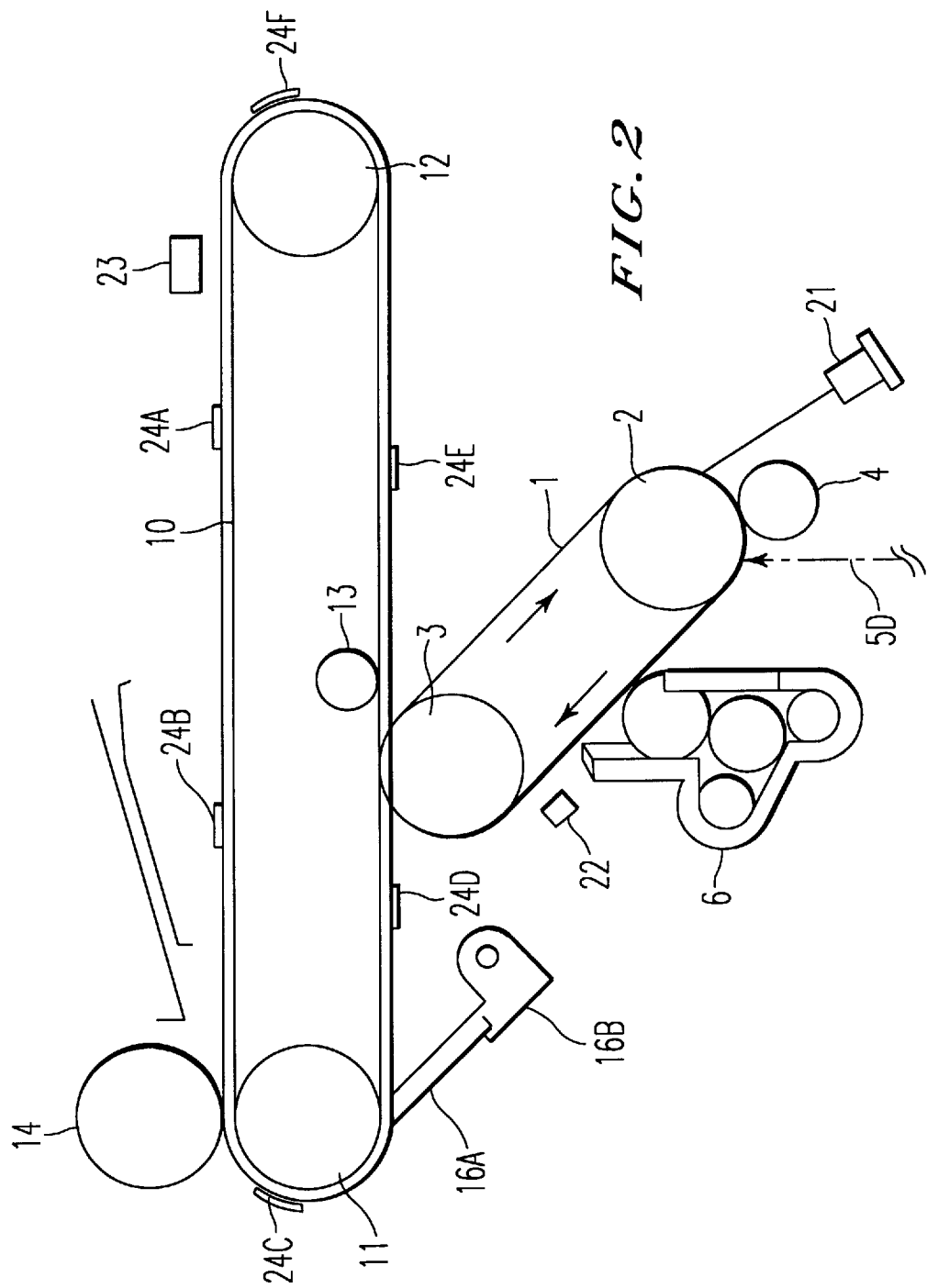
FIG. 2 is a fragmentary view, on an enlarged scale, of a portion of the color image forming apparatus shown in FIG. 1.

Referring now to the drawings, wherein like reference numerals designate identical or corresponding parts throughout the several views, and more particularly to FIG. 1 thereof, there is illustrated a color image forming apparatus of an exemplary embodiment of an image forming apparatus according to the present invention. In addition, FIG. 2 shows a detail of an image development portion of the color image forming apparatus. There are illustrated in FIGS. 1 and 2 a belt photoconductor 1, a pair of belt photoconductor rollers 2–3, a charging member 4, an optical writing unit 5, a set of color toner development kits 6–9, an intermediate transfer belt 10, a pair of intermediate transfer rollers 11–12, a bias roller 13, a transfer roller 14, a belt photoconductor cleaner 15, an intermediate transfer belt cleaner 16, a cleaning blade 16A, a cleaning blade supporting member 16B, a paper cassette 17, a paper feed roller 18, an upper registration roller 19, and a fixing unit 20. There are further illustrated in FIGS. 1 and 2 a driving motor 5A, a polygon mirror 5B, an fθ(f-theta) lens 5C, a laser beam 5D, a laser diode(LD) 5E, a quenching lamp 21, a photosensor 22, a mark detect sensor 23, and a set of marks 24A–24F. There are still further illustrated in FIGS. 1 and 2 a system controller 100 for controlling the operations of the color image forming apparatus, a process controller 200 for controlling conditions of an image development, and a laser beam generating circuit 300 for generating a laser beam.

The belt photoconductor 1 made of a flexible material for forming an image thereon is held by the pair of rollers 2–3, and rotates clockwise when the pair of the rollers 2–3 is driven clockwise. The optical writing unit 5 for generating a laser beam to write an image is composed of a laser exposing system and its housing has a slit therethrough for passing a laser beam. In place of the optical writing unit 5 as a laser optical system, there can be applied an alternative optical system in which a light source and a converging optical transmitter are integrated. The charging member 4, the laser exposure 5D, and the belt photoconductor cleaner 15 are provided at the side of the roller 2 which is one of rollers holding the belt photoconductor 1.

Each one of the color toner development kits 6–9 carries its respective color toner, for example, yellow(Y), magenta (M), cyan(C), or black (Bk) toner. These color toner development kits each include a development sleeve which comes close to or makes contact with the surface of the belt photoconductor 1 at a predetermined position. With the development sleeve, each color toner development kit forms a latent image visualized on the belt photoconductor 1, in a non-contact development method or in a contact development method.

The intermediate transfer belt 10 for transferring an image is held by the rollers 11–12 and rotates counterclockwise by rotation of the rollers 11–12. The bias roller 13 is installed inside of the intermediate transfer belt 10 to attract toner to form an image. The intermediate transfer belt cleaner 16 cleans the intermediate transfer belt 10. As the belt photoconductor 1 moves while making contact with the intermediate transfer belt 10 at the position of the transmission roller 3, a visualized image formed on the belt photoconductor 1 is transferred onto the intermediate transfer belt 10 by the bias roller 13.

When the individual image forming processes are repeated four times, the first visualized image transferred onto the intermediate transfer belt 10 is accurately overlaid with a second visualized image through a fourth visualized image in sequence. The transfer roller 14 is installed at a position to make contact with the intermediate transfer belt 10.

The intermediate transfer belt cleaner 16 cleans the intermediate transfer belt 10. The cleaning blade 16A provided in the intermediate transfer belt cleaner 16 is held off the surface of the intermediate transfer belt 10 during an image forming process, and is held in contact under pressure against the surface of the intermediate transfer belt 10 during a cleaning process after an image transferring process in the image forming process as shown in FIGS. 1 and 2.

Following is an explanation of a process of color image forming by the above-mentioned color image forming apparatus according to the present invention. When reading an original image, an image reading device generates an image signal representing the original image. The image signal is converted into data and is, through data processings and calculations, stored in an image memory. The stored image data is read out from the image memory, when being required to be recorded, and is sent to a color image forming device. More specifically, an image reading device, which is not necessarily to be a part of the color image forming apparatus, outputs a signal representing color image data which is then sent to an optical writing unit of the color image forming apparatus such as a color laser printer or the like. When the color image data is input to the optical writing unit 5, the laser diode 5E generates a laser beam which is irradiated on the surface of the belt photoconductor 1. An electrostatic latent image is thereby formed on the surface of the belt photoconductor 1. At this time, parameters, such as, for example, a dot resolution, strength of a laser beam light, a size of a laser beam spot, a scanning speed, and so forth, for determining quality of an image to be formed are designated. The instruction buffer denoted by a reference numeral 22 shown in FIG. 2 represents a buffer for buffering an instruction, such as, for example, a switch of image resolution between a 300 dpi and a 600 dpi resolution, as an example.

The above-mentioned electrostatic latent image is a single colored image. Impinging on the surface of the rotating polygon mirror 5B driven by the driving motor 5A, the laser beam is reflected to the direction of the fθ lens 5C with a scanning motion. Passing through the fθ lens 5C, the laser beam falls on a mirror by which the laser beam is changed in direction, and then falls on the surface of the belt photoconductor 1. By this time, the surface of the belt photoconductor 1 is discharged by the quenching lamp 21 and is evenly charged again by the charging member 4. The surface of the rotating belt photoconductor 1 is thereby exposed to the laser beam and is thus formed with an electrostatic latent image thereon. At this time, an image pattern written by the laser beam exposure is a single color image pattern. This single color image pattern is the one formed when a full colored image is separated into four colors of Y, M, C, and Bk through a color separation processing.

Electrostatic latent images sequentially created on the surface of the photoconductor 1 are sequentially visualized in each color of Y, M, C, and Bk with the color toner development kits 6–9 for Y, M, C, and Bk, respectively. A set of these color toner development kits 6–9 forms a rotary development unit. The visualized single colored toner images in Y, M, C, and Bk formed on the belt photoconductor 1 are sequentially transferred onto the surface of the intermediate transfer belt 10 which is rotating counterclockwise while making contact with the belt photoconductor 1. The four single colored images are thus overlaid on the intermediate transfer belt 10.

During this period of time, paper is supplied from the paper cassette 17 and is fed, through the paper feeding roller 18 and the registration roller 19, to an image transferring portion in which the transferring roller 14 is located. An image made of the overlaid four single colored images on the intermediate transfer roller 10 is then transferred onto the paper by the transferring roller 14. After transferring an image onto the paper is completed, the paper is fed to the fixing unit 20, thereby fixing the image on the paper. A seamless belt is preferably employed for both the intermediate transfer belt and the belt photoconductor used in the above-mentioned process, although other constructions are possible.

In FIG. 2, there are shown six marks 24A–24F provided at the side end of the outer surface of the intermediate transfer belt 10. When a mark detecting sensor 23 detects any one of these marks, for example, the mark 24A, a process of image exposure for forming a first single colored image is started. Further, when the mark detecting sensor 23 detects the mark 24A another time after one rotation, a process of image exposure for a second single colored image is started. During this operation, a number of marks passing is counted and mark signals are accordingly masked so as not to use the marks 24B–24F as a start mark for a process of image exposure. In addition, there is provided the photosensor 22 as shown in FIG. 2 for detecting an amount of toner deposited on the surface of the belt photoconductor 1, the position of which is between the belt photoconductor roller 3 and a color toner development kit.

Figure 3:
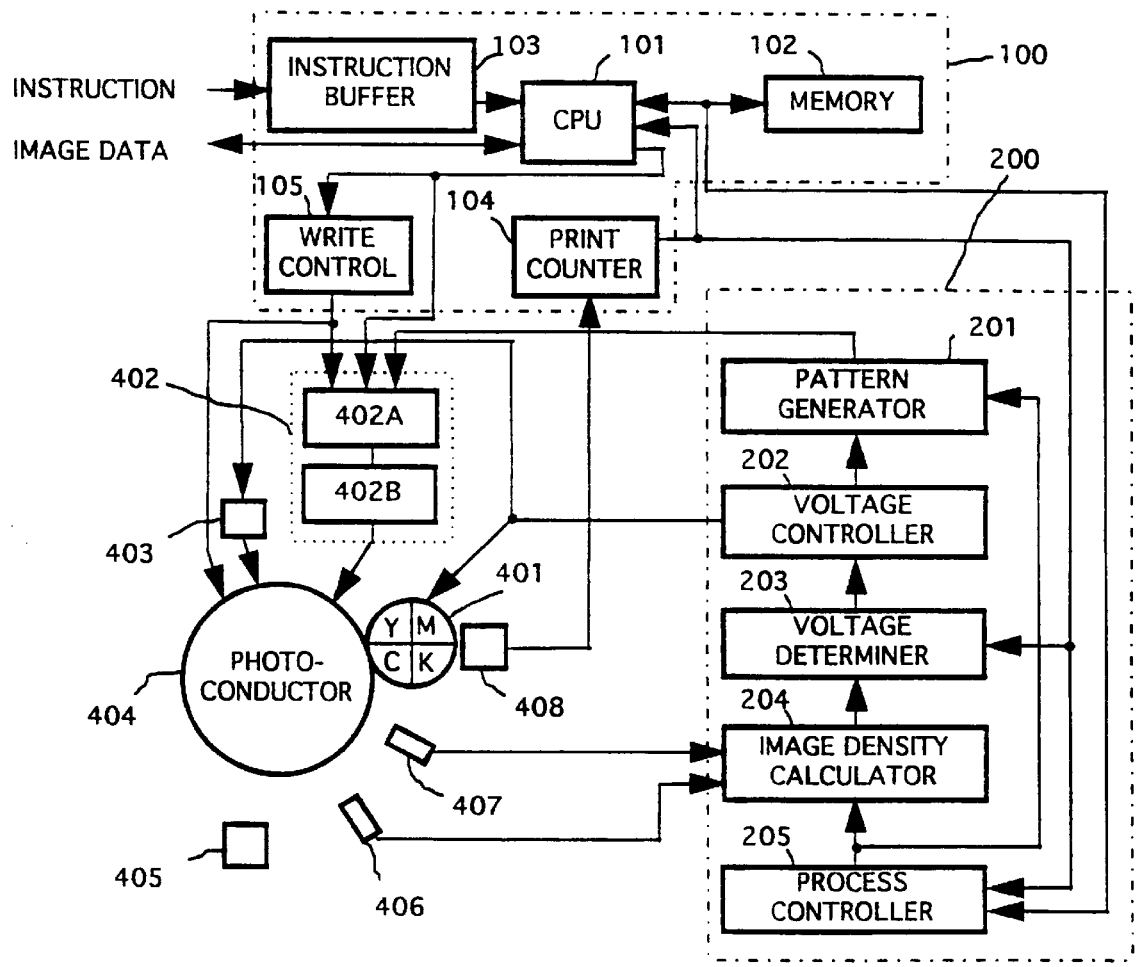
FIG. 3 is an illustration for explaining a configuration of an embodiment of an image forming portion.

Next, a procedure of correction for varying image density is explained with respect to FIG. 3 which shows a block diagram of an exemplary embodiment of an image forming portion of the color image forming apparatus according to the present invention. The configuration of the image forming portion shown in FIGS. 3 is capable of calculating an appropriate degree of image density to be represented in an image created on the surface of a photoconductor. In a part of FIG. 3, there is illustrated a conceptual configuration including parts and devices, such as, a development device 401, an optical writing device 402, a charging device 403, a photoconductor 404, a transferring device 405, and a photosensor 406, all these of which correspond to the parts and devices illustrated in FIGS. 1 and 2, such as, the development unit composed of a set of color toner development kits 6–9, the optical writing unit 5, the charging member 4, the belt photoconductor 1, the transferring roller 14, and the photosensor 22, respectively. In addition, FIG. 3 includes a temperature sensor 407.

In the remaining part of FIG. 3, there are illustrated a main control circuit 100 and a process controller circuit 200 including a CPU (central control unit) 101, a memory 102, an instruction buffer 103, a print counter 104, and a writing controller 105, and including a pattern generator 201, a voltage controller 202, a voltage determiner 203, an image density calculator 204, and a process controller 205, respectively. The CPU 101 controls the overall operation based on a configuration shown in FIG. 3. The memory 102 stores contents of changing conditions such as, for example, a dot resolution, a strength of a laser beam light, a size of a laser beam spot, a scanning speed, and so forth, and also stores respective data associated with. The instruction buffer 103 buffers an instruction. The print counter 104 counts the number of prints made. The pattern generator 201 for generating data representing predetermined dot patterns sends data of these predetermined dot patterns in several pattern groups to the optical writing device 402 including the laser beam generating circuit 300 and the optical writing unit 5 for writing dot patterns. The optical writing device 402 optically writes data representing these predetermined dot patterns in several pattern groups on the photoconductor 404 so that a latent image is written on the photoconductor 404. After that, the latent image written on the photoconductor 404 is converted into a visualized image with one of Y, M, C, and Bk color toner by the development device 401. Then, the photosensor 406 detects a pattern of the visualized image and the temperature sensor 407 detects a temperature around the visualized image.

Figure 4A:
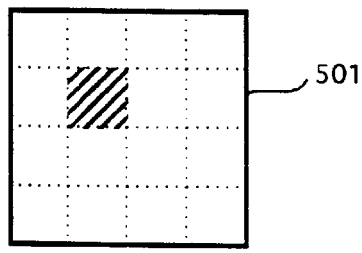
FIGS. 4(A)–4(B) are illustrations showing examples of a 4 by 4 dot pattern.
Figure 4B:
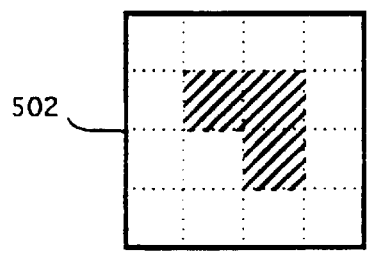
Figure 5:
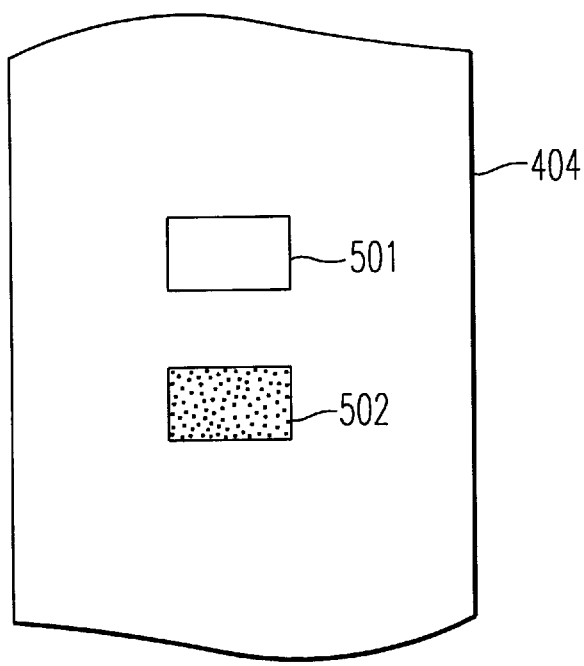
FIG. 5 is an illustration showing an example of a manner of writing the 4 by 4 dot pattern on a photoconductor.

FIGS. 4(A) and 4(B) show appearances of exemplary dot patterns, 501 and 502, both created by the above-mentioned procedure each using a 4 by 4 pattern, as an example. FIG. 5 shows an exemplary manner in which these exemplary dot patterns, 501 and 502, are written on the surface of the photoconductor 404.

Figure 6:
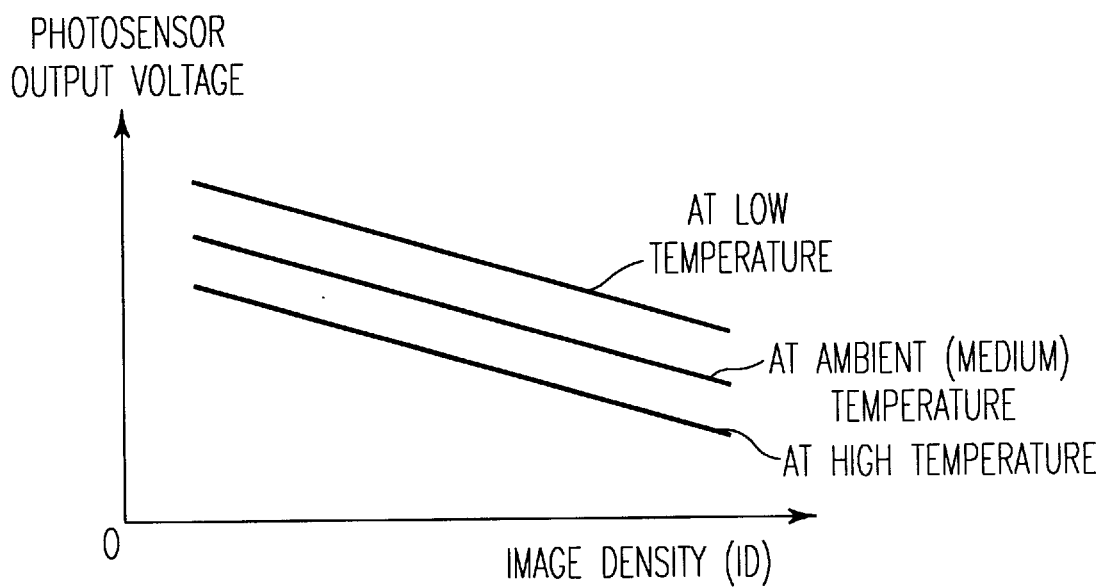
FIG. 6 is a graph explaining a relationship between an output voltage from a photosensor and image density at different temperatures.

A graph in FIG. 6 summarizes a relationship between an output voltage from the photosensor 406, when detecting an image made of a 4 by 4 pattern with four dots, and image density(ID) represented in a solid black image, at three different temperatures. These temperatures are temperatures near the temperature sensor 407 and/or the photoconductor 404, and can be determined by measuring the air temperature near or around the temperature sensor 407 and/or the photoconductor 404 (e.g., ambient temperature near these elements). FIG. 6 accordingly indicates that an output voltage from the photosensor 406 rises as a temperature falls. On the basis of this relation, the output voltage from the photosensor 406 when detecting an image can be compensated for in accordance with an ambient temperature change detected by the temperature sensor 407, and an appropriate degree of image density to be represented in the image can be calculated by an image density calculator 204 on the basis of the compensated output voltage.

Figure 7:
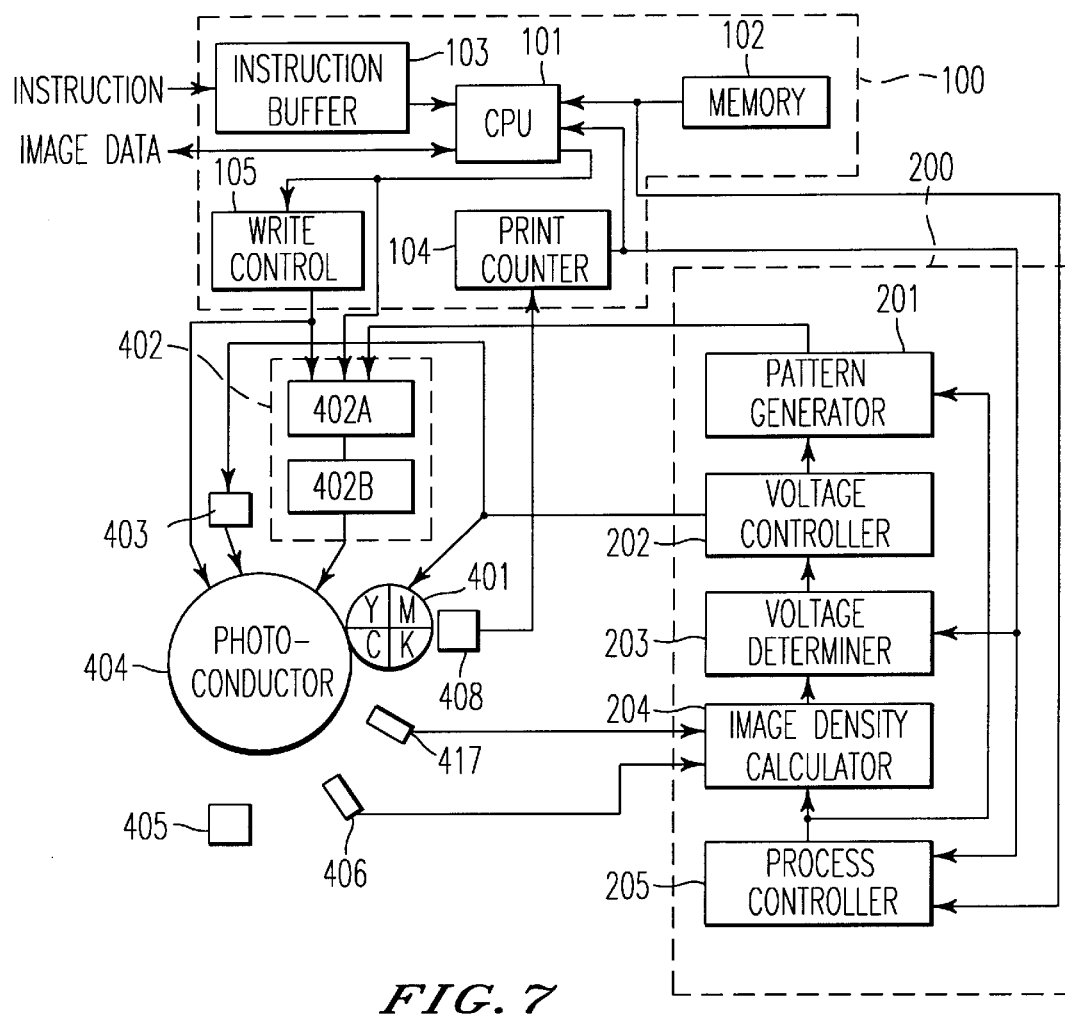
FIG. 7 is an illustration for explaining a configuration of a modified embodiment of the image forming portion.
Figure 8:
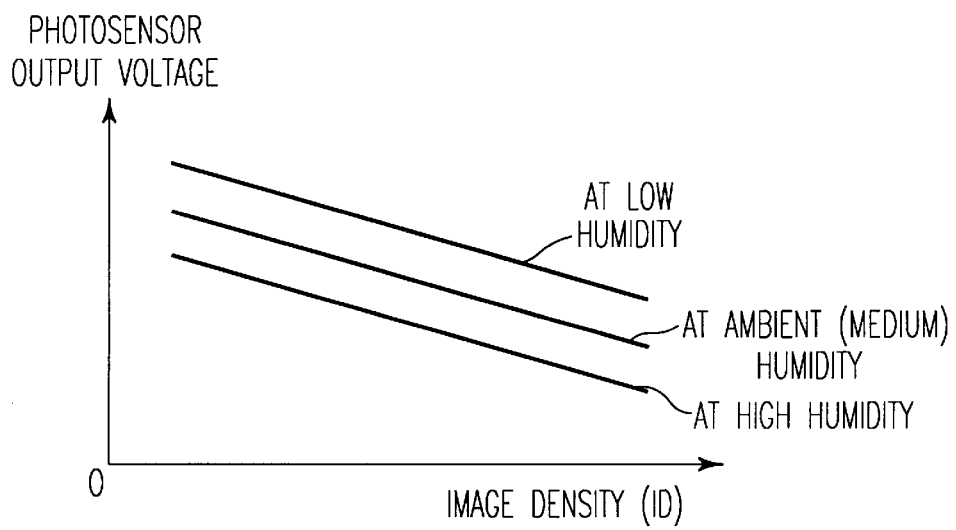
FIG. 8 is a graph explaining a relationship between an output voltage from a photosensor and image density at different humidities.

Next, a modified procedure of correction for varying image density is explained with respect to FIG. 7, showing a block diagram of a modified exemplary embodiment of the image forming portion shown in FIG. 3. FIG. 7 is similar to FIG. 3 except that the temperature sensor 407 is replaced with a humidity sensor 417. Under this configuration, the image forming portion shown in FIG. 7 is capable of calculating an appropriate degree of image density to be represented in an image created on the surface of the photoconductor 404. A graph shown in FIG. 8 summarizes a relationship between an output voltage from the photosensor 406, when detecting an image made of a 4 by 4 pattern with four dots, and image density to be represented in a solid black image, having a parameter of an ambient humidity or humidity near the photoconductor. As similar to FIG. 6 above, FIG. 8 shows that an output voltage from the photosensor 406 rises as humidity falls. On the basis of this relation, the output voltage from the photosensor 406 is compensated for in accordance with the ambient humidity detected by the humidity sensor 417, and an appropriate degree of image density to be represented in the image can be calculated by the image density calculator 204 on the basis of the compensated output voltage.

Figure 9:
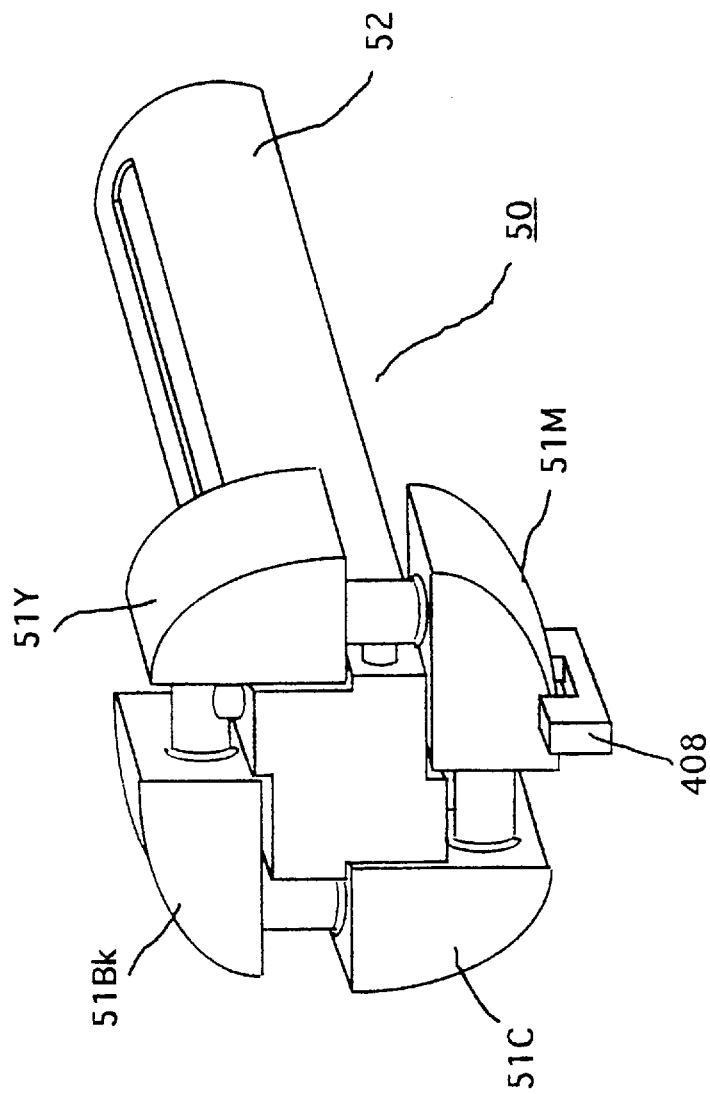
FIG. 9 is a perspective external view of an embodiment of a development unit.
Figure 10:
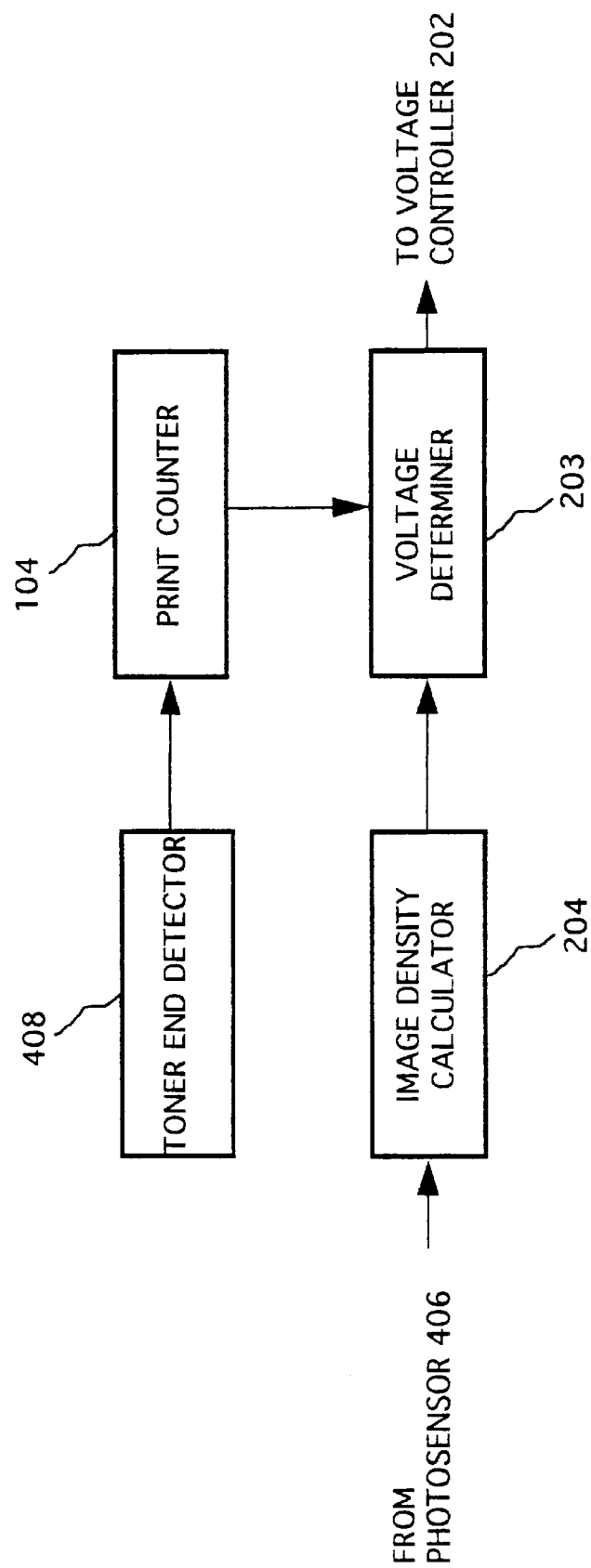
FIGS. 10–12 are block diagrams for explaining data flows with different corrective inputs.

FIG. 9 illustrates an exemplary embodiment of a rotary development unit of the color image forming apparatus according to the present invention. A block diagram for explaining a procedure of correction of development biases of the exemplary embodiment of the rotary development unit is shown in FIG. 10. The rotary development unit includes attachable and detachable toner cartridges 51Y, 51M, 51C, 51Bk, an attachable and detachable development device 52, and a toner end detector 408. The attachable and detachable toner cartridges 51Y, 51M, 51C, and 51B, correspond to the color toner, yellow(Y), magenta(M), cyan(C), and black(Bk), respectively. Furthermore, this rotary development unit in FIG. 9 corresponds to the development unit shown in FIG. 1, and the parts included in FIGS. 9 and 1 are therefore corresponding each other; the attachable and detachable toner cartridges 51Y, 51M, 51C, and 51B in FIG. 9 correspond to the color toner development kits 6–9 in FIG. 1, respectively, for example. In a configuration shown in FIGS. 9, each color toner is supplied from attachable and detachable toner cartridges 51Y, 51M, 51C, or 51Bk into the development device 52. A shortage in amount of each color toner is detected by the toner end detector 408. In a case that a toner shortage is detected, the cartridge is replaced with a new cartridge. At this time, for a period of time after the toner cartridges 51Y, 51M, 51C, and/or 51Bk is exchanged, an amount of toner to be deposited on the surface of the photoconductor generally decreases to some extent. As a result, a degree of image density represented in a solid black image may be changed and may become relatively lower than a degree of image density calculated on the basis of a detection of the image made of the 4 by 4 pattern with four dots. This change in image density can also be calculated by the image density calculator 204 on the basis of the output voltage from the photosensor 406.

Referring further to FIG. 10, an operation of a toner cartridge exchange is further explained. When a toner end is detected by a toner end detector 408, a toner cartridge will soon be exchanged by an operator. At this time, the toner end detector 408 also detects a termination of toner end, and accordingly sends a toner end release signal to the print counter 103, which then starts to count a number of prints of each color to be made by the rotary development unit after an exchange of the toner cartridge. Information of the number of prints is sent to the voltage determiner 203. On the other hand, information of the calculated image density is also sent to the voltage determiner 203 from the image density calculator 204, on the basis of which the information the voltage determiner 203 calculates the required bias voltages at each portion. These calculated bias voltages are corrected on the basis of the information of number of prints sent from the print counter 103, An appropriate degree of image density can thus be obtained even after the toner cartridge is exchanged.

Figure 11:
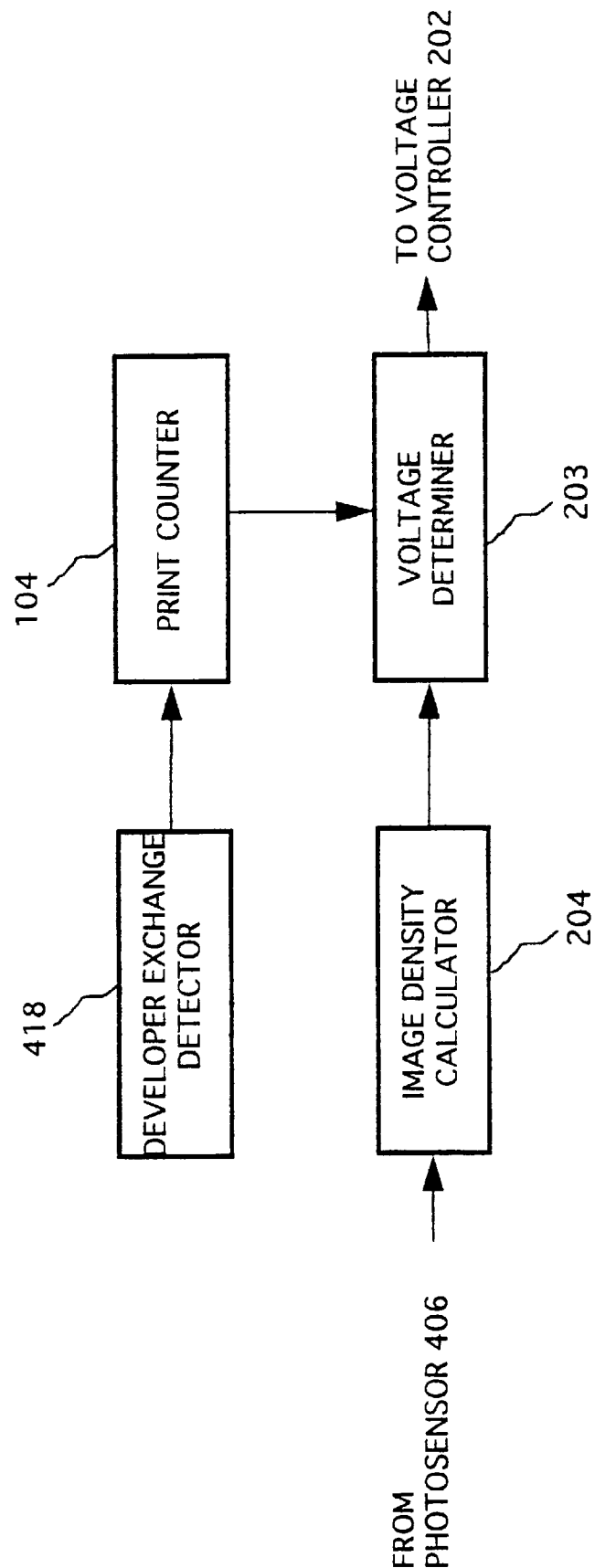

FIG. 11 shows a block diagram for explaining a procedure of correction of development biases of a modified exemplary embodiment of the rotary development unit shown in FIG. 10. This embodiment is specifically for a color image forming apparatus employing a two component development process. The performance of developer, accelerating toner image development, tends to deteriorate with an increase in usage, or a number of prints. After a large number of prints, a degree of image density represented in a solid black image may therefore be changed and may become relatively higher than a degree of image density calculated on the basis of a detection of the image of the 4 by 4 pattern with four dots. This change in image density can also be calculated by the image density calculator 204 on the basis of the output voltage from the photosensor 406. Referring further to FIG. 11, a developer exchange detector 418 for detecting an exchange of developer detects an exchange of developer. The developer exchange detector 418 then sends a developer exchange signal to the print counter 104 which counts a number of prints by the rotary development unit after the exchange of developer. Information of the number of prints is sent to the voltage determiner 203. On the other hand, information of the calculated image density is also sent to the voltage determiner 203 from the image density calculator 204, on the basis of the information the voltage determiner 203 calculates as the required bias voltages at each portion. These calculated bias voltages are corrected on the basis of the information of number of prints sent from the print counter 103. An appropriate degree of image density can thus be obtained even when the developer deteriorates.

Figure 12:
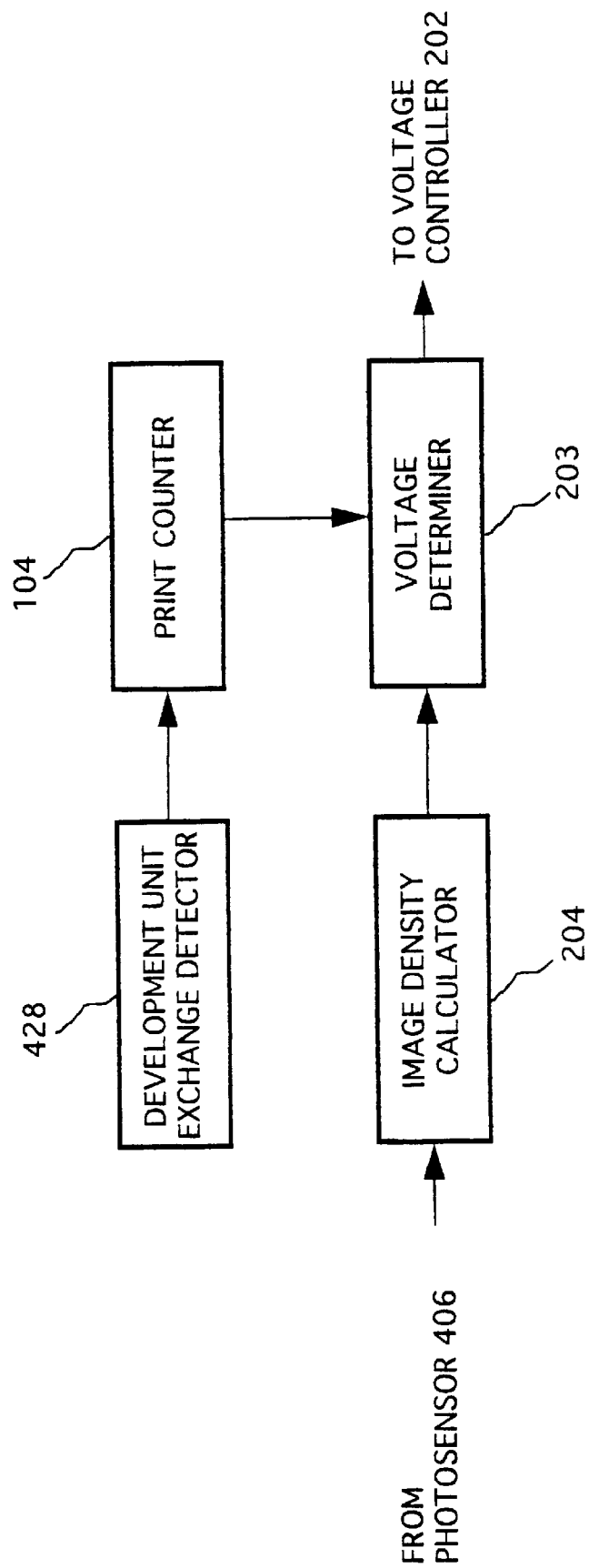

FIG. 12 shows a block diagram for explaining a procedure of correction of development biases of another modified exemplary embodiment of the rotary development unit in FIG. 10. This embodiment is specifically designed for a case when the attachable and detachable development device 52 is exchanged. For a period of time after an attachable and detachable development unit 52 is exchanged, an amount of toner to deposit on the surface of the photoconductor 1 generally increases to some extent. As a result, a degree of image density represented in a solid black image may be changed and may become relatively higher than a degree of image density calculated on the basis of a detection of the image made of the 4 by 4 pattern with four dots. This change in image density can also be calculated by the image density calculator 204 on the basis of the output voltage from the photosensor 406.

Referring further to FIG. 12, when the attachable and detachable development device 52 is exchanged, a development device exchange detector 428 detects the exchange and sends a detect signal to the print counter 103. The print counter 103 then starts to count a number of prints by each color to be made by the rotary development unit after an exchange of the attachable and detachable development device 52. Information of the number of prints is sent to the voltage determiner 203. On the other hand, information of the calculated image density is also sent from the image density calculator 204 to the voltage determiner 203 which calculates the required bias voltages at each portion. These calculated bias voltages are corrected on the basis of the information of the number of prints sent from the print counter 103. An appropriate degree of image density can thus be obtained even after the attachable and detachable development device 52 is exchanged.

Figure 13:
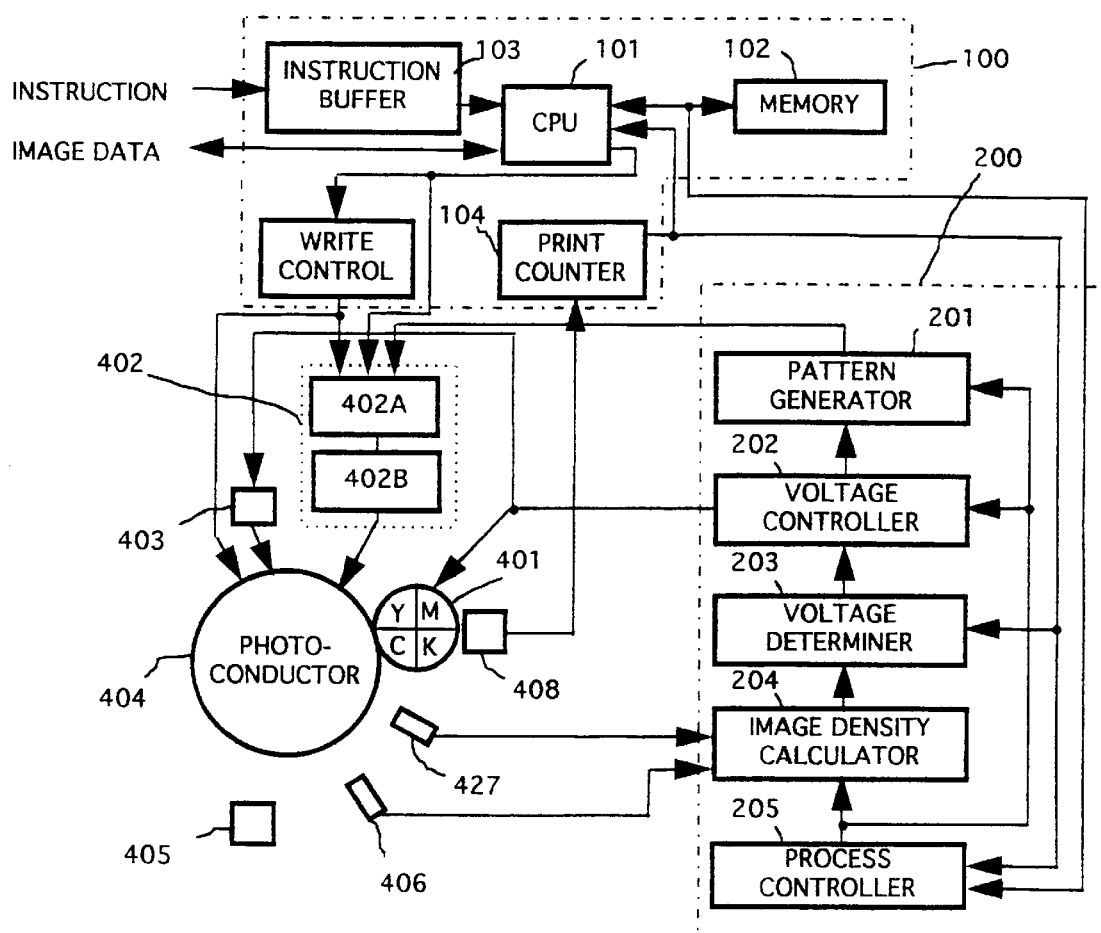
FIG. 13 is an illustration for explaining a configuration of another embodiment of the image forming portion.
Figure 14:
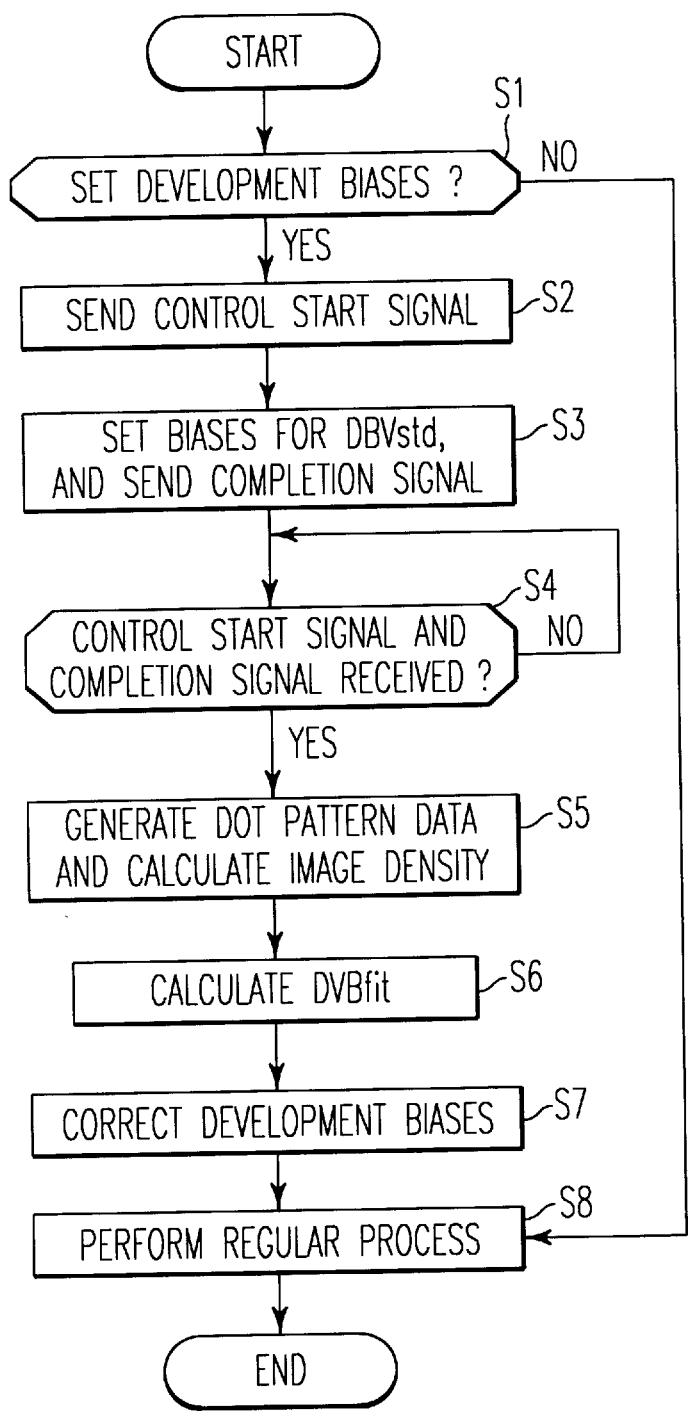
FIG. 14 is a flowchart explaining an operation of the embodiment of the image forming portion shown in FIG. 13.

Next, another modified procedure of correction for varying image density is explained with respect to FIGS. 13 and 14. FIG. 13 shows a block diagram of another modified exemplary embodiment of the image forming portion shown in FIG. 3, and FIG. 14 is a flowchart for explaining how various bias voltages are adjusted to obtain an appropriate degree of image density. FIG. 13 is similar to FIG. 3 except that the temperature sensor 407 is replaced with a temperature and humidity sensor 427 and that the process controller 205 is connected to the voltage controller 202. The output voltage from the photosensor 406 can thereby be compensated for in accordance with the ambient temperature and humidity changes detected by the temperature and humidity sensor 427, and an appropriate degree of image density to be represented in the image can be calculated by the image density calculator 204 on the basis of the compensated output voltage. Under this configuration, the image forming portion shown in FIG. 13 is capable of calculating an appropriate degree of image density to be represented in an image created on the surface of the photoconductor 404.

Referring to FIG. 14, in Step S1, the CPU 101 checks whether or not an instruction for changing conditions of an optical writing operation, such as an image resolution change, as an example, which instruction requires a setting of various bias voltages, is input. If YES, the CPU 101 instructs the process controller 205 to send a start control signal to the voltage controller 202 and the pattern generator 201 in Step S2. Upon confirming that the voltage controller 202 receives the start control signal, the CPU 101 instructs the voltage controller 202 to set the charging input voltage and the biases for the development roller, toner supplying roller, and development blade, in accordance with their respective predetermined values for obtaining a standard development bias or potential DVBstd which is a predetermined value for this embodiment. After this process, the CPU 101 instructs the voltage controller 202 to send a completion signal for indicating a completion of setting the predetermined biases for obtaining the standard development potential to the pattern generator 201 in Step S3.

After the pattern generator 201 detects both a start control signal and a completion signal, which detections are checked by the CPU 101 in Step S4, the CPU 101 instructs the pattern generator 201 to generate dot pattern data so as to start an image forming process in Step S5; the optical writing device 402 to write the dot pattern on the photoconductor 404, the development device 401 to develop the latent image, and the photosensor 406 to measure image density represented in the dot pattern on the photoconductor 404. After that, the CPU 101 instructs the image density calculator 204 to calculate an appropriate degree of image density on the basis of the measurement of the dot pattern image written on the surface of the photoconductor 404, also in Step S5.

On the basis of the calculated degree of image density by the image density calculator 204, the standard degree of image density designed for this embodiment can accordingly be obtained by the voltage determiner 203 which calculates in step S6 DVBfit, the most preferable development potential, on the basis of a difference between a relationship between reference image density and DVBfit and a relationship between the calculated image density and DVBstd. After that, the CPU 101 also instructs the image density calculator 204 to send the calculated DVBfit of the most-preferable development potential to the voltage controller 202 in Step S6. The CPU 101 then proceeds to Step S7 in which the CPU 101 instructs the voltage controller 202 receiving DVBfit to perform correction for the charging input voltage and for biases for the development roller, toner supplying roller, and development blade on the basis of DVBfit. The corrected voltages and biases are accordingly supplied to the appropriate portions, and each portion operates in accordance with the corrected voltage or biases in Step S8. At this time, the CPU 101 arranges to store the above-mentioned values, the charging input voltage, development roller bias, toner supplying roller bias, and development blade bias by each recording density.

Figure 15:
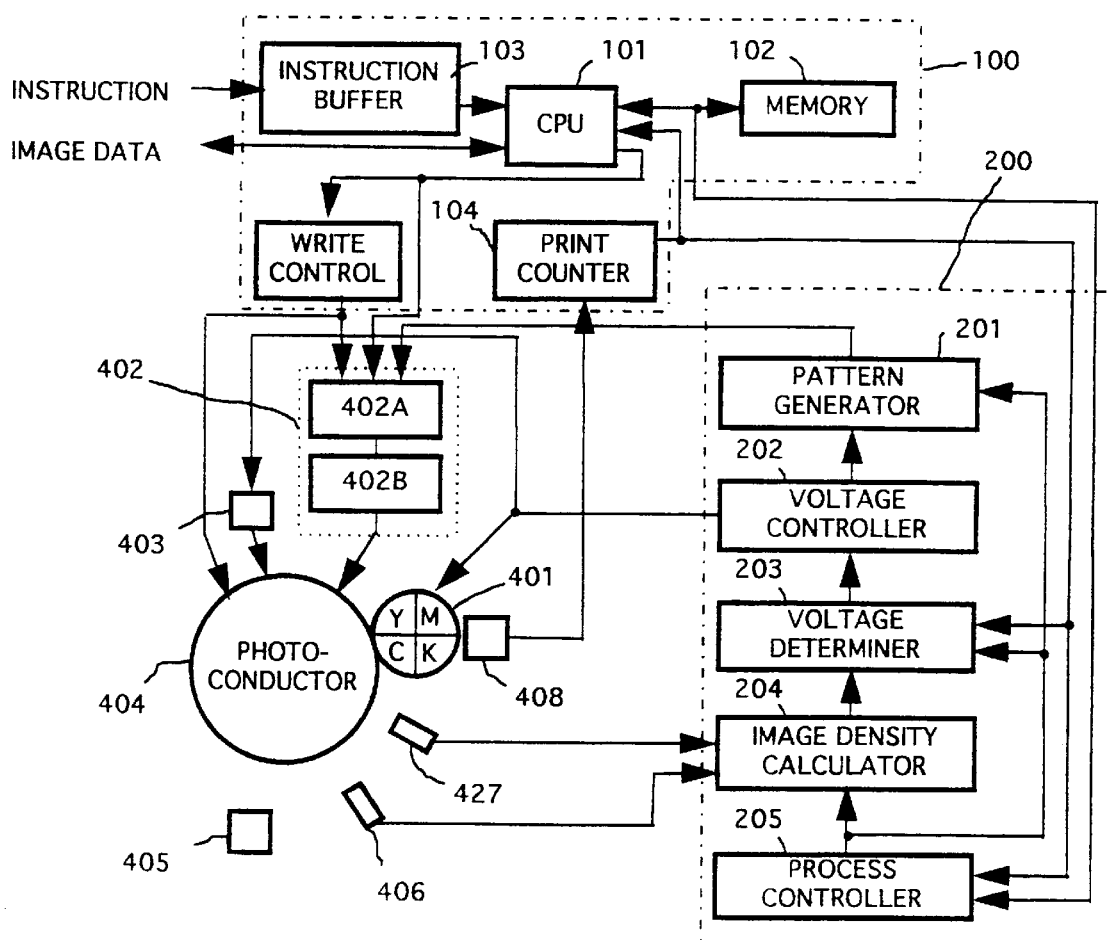
FIG. 15 is an illustration for explaining a configuration of another embodiment of the image forming portion.
Figure 16:
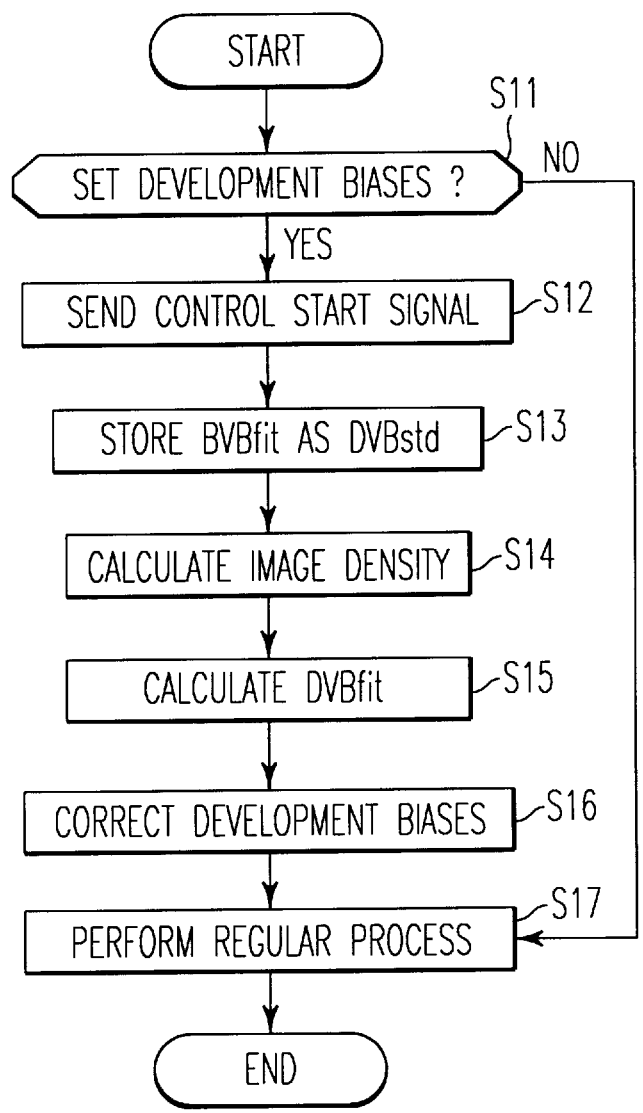
FIG. 16 is a flowchart explaining an operation of the embodiment of the image forming portion shown in FIG. 15.

Next, another modified procedure of correction for varying image density is explained with respect to FIGS. 15 and 16. FIG. 15 shows a block diagram of still another modified exemplary embodiment of the image forming portion shown in FIG. 3, and FIG. 16 is a flowchart for explaining how various bias voltages are adjusted to obtain an appropriate degree of image density. FIG. 15 is similar to FIG. 3 except that the temperature sensor 407 is replaced with the temperature and humidity sensor 427 and that the connection between the process controller 205 and the voltage controller 202 is replaced with a connection between the process controller 205 and the voltage determiner 203. The output voltage from the photosensor 406 can thereby be compensated for in accordance with the ambient temperature and humidity changes detected by the temperature and humidity sensor 427, and an appropriate degree of image density to be represented in the image can be calculated by the image density calculator 204 on the basis of the compensated output voltage. Under this configuration, the image forming portion shown in FIG. 15 is capable of calculating an appropriate degree of image density to be represented in an image created on the surface of the photoconductor 404.

Referring to FIG. 16, in Step S11 the CPU 101 checks whether or not an instruction of adjustment of various bias voltages is input. If YES, the CPU 101 instructs the process controller 205 to send a start control signal to the voltage controller 202 and the pattern generator 201 in Step S12. Upon confirming that the voltage controller 202 receives the start control signal, the CPU 101 instructs the voltage determiner 203 to apply DVBfit which is a currently determined most preferable development potential as a standard development potential, DVBstd, in step S13. At the same time and also in Step S13, the pattern generator 201 generates dot pattern data so as to start an image forming process; the optical writing device 402 to write the dot pattern on the photoconductor 404, the development device 401 to develop the latent image, and the photosensor 406 to measure image density represented in the dot pattern on the photoconductor 404. The development potential obtained by this process may be referred to as a present development potential DVB. After that, the CPU 101 instructs the image density calculator 204 to calculate an appropriate degree of image density on the basis of the measurement of the dot pattern image written on the surface of the photoconductor 404 in Step S14.

On the basis of the calculated degree of image density by the image density calculator 204, the standard degree of image density designed for this embodiment can accordingly be obtained by the voltage determiner 203 in a way that DVBfit of a most preferable development potential is to be calculated on the basis of a difference between a relationship between reference image density and DVBfit and a relationship between the calculated image density and DVBstd, in step S15. After that, the CPU 101 also instructs the image density calculator 204 to send the calculated DVBfit of the most preferable development potential to the voltage controller 202 in Step S15. The CPU 101 then proceeds to Step S16 in which the CPU 101 instructs the voltage controller 202 receiving DVBfit to perform correction for the charging input voltage and for biases for the development roller, toner supplying roller, and development blade on the basis of DVBfit. The corrected voltages and biases are accordingly supplied to the appropriate portions, and each portion operates in accordance with the corrected voltage or biases in Step S17. At this time, the CPU 101 arranges to record above-mentioned values, the charging input voltage, development roller bias, toner supplying roller bias, and development blade bias by each recording density.

In the exemplary embodiment of the color forming apparatus according to the present invention shown in FIG. 1, two different modes of dot resolution are adopted as explained earlier. These resolution modes are a 300 dpi(dot per inch) and a 600 dpi(dot per inch). In order to change resolutions, in the main scanning direction, a clock for an image is selectively adjusted so as to become either a 300 dpi or a 600 dpi. Also, in the sub-scanning direction, a speed of rotation of the photoconductor is selectively adjusted to produce either a 300 dpi or a 600 dpi resolution.

Figure 17:
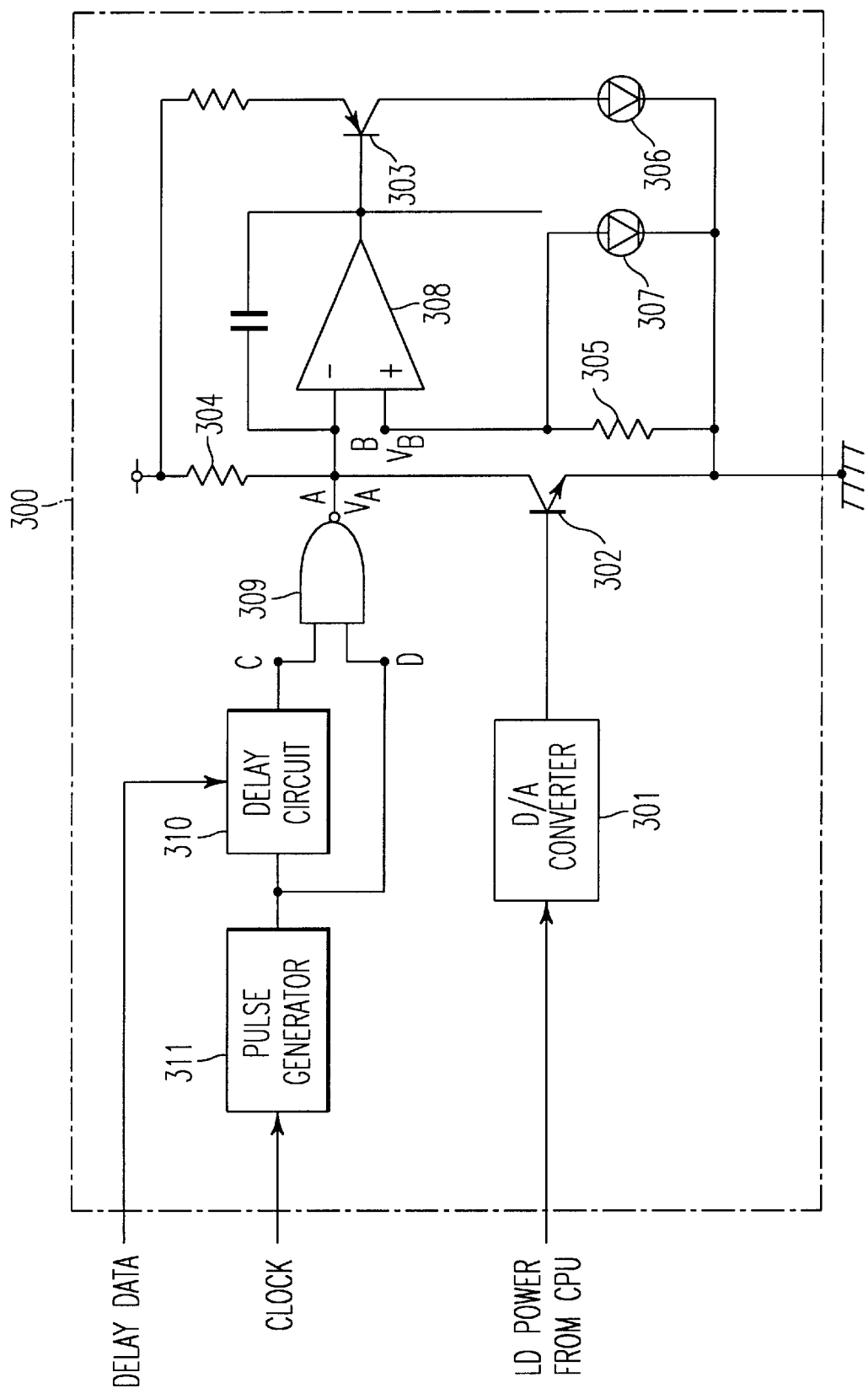
FIG. 17 is a circuit diagram showing an exemplary embodiment of a laser beam generating circuit.

Next, an operation of an exemplary driving circuit for driving the optical writing unit 5 is explained with respect to FIG. 17. A driving circuit 200 in FIG. 17 includes a D/A(digital to analog) converter 301, transistors 302 and 303, resisters 304 and 305, an LD 306, a photodiode 307, an operational amplifier 308, a NAND circuit 309, a delay circuit 310, and a pulse generator 311. The CPU 101 provides the D/A converter 301 with a digital signal representing a value of an LD drive power to be supplied to the LD 306. The LD power value is set in accordance with a predetermined value for each designated resolution mode. The D/A converter 301 converts the digital LD power signal into an analog signal. A current running through the transistor 302 varies in accordance with an output from the D/A converter 301, and a voltage $V_A$ at a junction A is thereby determined in accordance with the designated resolution mode. A driving current for the LD 306 is determined by the transistor 303 connected serially therewith. An optical output or light amount of laser beam from the LD 306 is detected by the photodiode 307. When sensing the light from the LD 306, the photodiode 307 allows a current to flow therethrough. The resister 305 causes a voltage drop in proportion to the degree of the current through the photodiode 307. Thus, a voltage $V_B$ at a point B is determined.

The comparator 308 compares the voltage $V_A$ at the minus input point A of the differential inputs and the voltage $V_B$ at the plus input point B of the differential inputs. In responding to an output from the comparator 308, the transistor 303 is turned on when $V_B$ is larger than $V_A$. The comparator 308 can thereby control the driving current for the LD 306.

Figure 18:
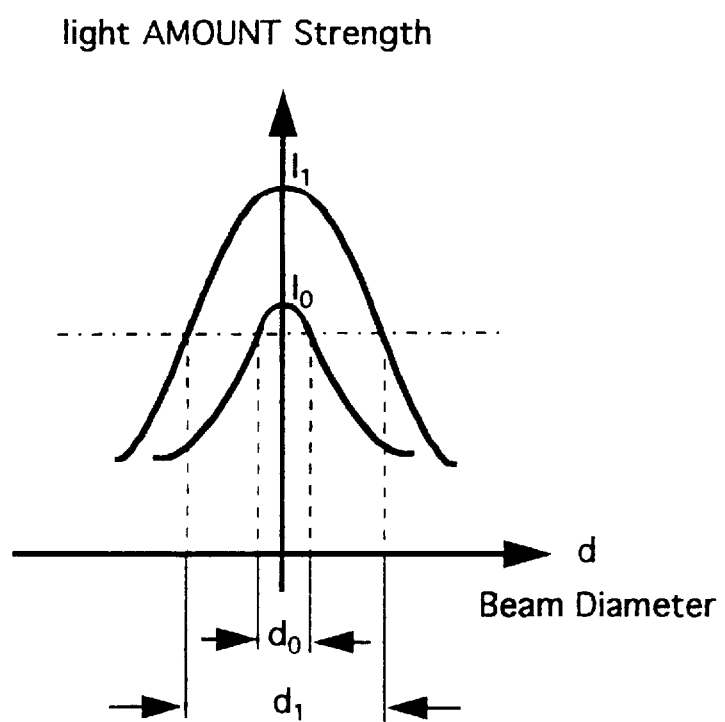
FIG. 18 is a graph explaining a relationship between light strength and a diameter of a laser beam with a parameter of a driving current.

FIG. 18 summarizes a relationship between a light strength of the laser beam from the LD 306 and a beam diameter "d" of the laser beam from the LD 306 with a parameter of the driving current for the LD 306. As a result of controlling the driving current for the LD 306, a diameter of a laser beam spot to be formed on the photoconductor can also be changed, the size of which changes in proportion to the light strength and a beam diameter "d" of the LD 306.

Referring further to FIG. 17, when a relatively low resolution such as 300 dpi, for example, is selected, a digital signal representing a relatively large value of the LD power is sent to the D/A converter 301, and is converted into an analog signal therein, following which the converted analog signal drives the transistor 302 so that the voltage $V_A$ increases. Accordingly, an output of the comparator 308 drops and a collector current running through the transistor 303 thereby increases, with a result of an increase of the driving current for the LD 306. As a result, the light amount of the laser beam increases as "$I_1$" as shown in FIG. 18, and the diameter of the laser beam spot becomes relatively large as "$d_1$" as shown in FIG. 18. To the contrary, when a relatively high resolution such as 600 dpi, for example, is selected, a digital signal representing a relatively small value of the LD power is sent to the D/A converter 301, and is converted into an analog signal which drives the transistor 302 so that the voltage $V_A$ decreases. Accordingly, an output of the comparator 308 rises and a collector current running through the transistor 303 thereby drops, with a result of a decrease of the driving current for the LD 306. As a result, the light amount of the laser beam decreases to "$I_0$" as shown in FIG. 18, and the diameter of the laser beam spot becomes smaller to "$d_0$" shown in FIG. 18. In addition, an automatic feedback control circuit known per se is included in the exemplary configuration of the laser diode driving circuit in FIG. 17, and a description thereof is not provided for brevity.

With further reference to FIG. 17, a modulation of a dot form is explained. The form of a dot is modulated by the circuit including a pulse generator 311 which is operated at a cycle of one picture element and for generating a pulse, the delay circuit 210 for delaying the pulse output from the pulse generator 311, and the NAND circuit 309 which receives signals from either the pulse generator 311 or the delay circuit 310. When both inputs from the pulse generator 311 and the delay circuit 310 become low, the output of the NAND circuit 309 becomes high. The output of the NAND circuit 309 is connected to the junction A, which becomes high when the output of the NAND circuit 309 becomes high. During a time that the output of the NAND circuit 309 is high, the transistor 302 is operable and a value of the LD power is to be transmitted. The delay circuit 310 is so configured as to vary its output representing a delay time for each picture element in accordance with predetermined voltage levels by each picture element. A circuit for generating such voltages for each picture element connected to the delay circuit 310 is not shown. The writing time period accordingly changes over the variation of delay time, and the form of a dot is thereby modulated. In this case, the delay circuit 310 receives analog information for each picture element representing a voltage with a range from 0 to 2 volts divided into 256 steps. Thus, a pulse width modulation is performed.

Figure 19:
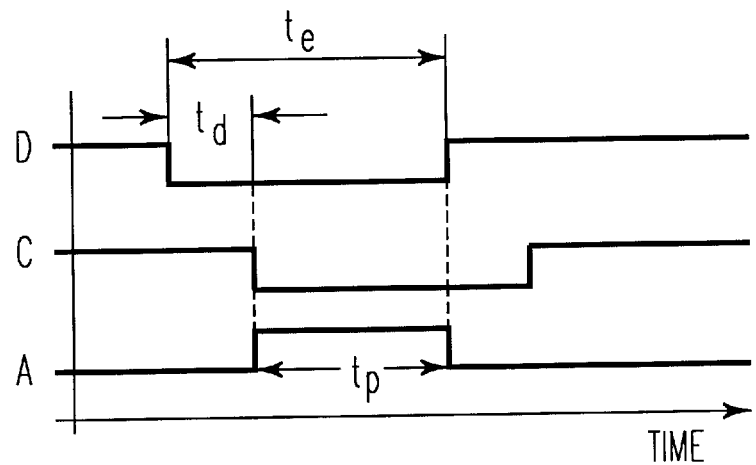
FIG. 19 is a timing diagram showing an operation of the driving circuit shown in FIG. 17.

FIG. 19 shows a timing diagram summarizing relationships between signals shown in FIG. 17 and described above. Referring to FIGS. 17 and 19, a signal A in FIG. 19 is measured at the junction A after the NAND circuit 309, a signal D in FIG. 19 is measured at a point D after the pulse generator 311, and a signal C in FIG. 19 is measured at a point C after the delay circuit 310. A time for one picture element is represented as "$t_e$", and a delay of "$t_d$" is made by the signal D and the signal C. As a result, a time for making the LD power available is represented by "$t_p$" in FIG. 19.

Figure 20:
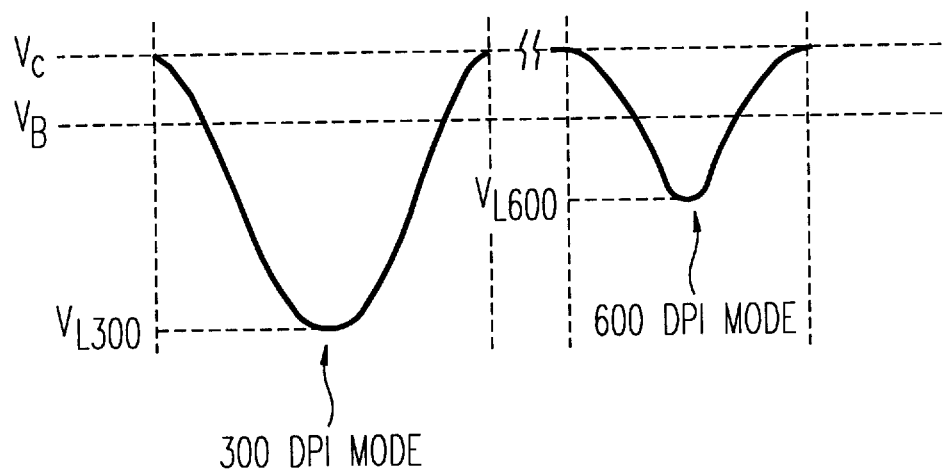
FIG. 20 is a wave form chart showing a wave form generated when the dot resolution is changed.

Next, a changing potential on the surface of the photoconductor with respect to the changing dot resolution is explained using FIG. 20. In FIG. 20, there is plotted potentials on the surface of the photoconductor when the dot resolution is switched between 300 dpi and 600 dpi. As it is previously described, a laser beam dot is modulated by controlling the LD power so as to be selectively used in each resolution mode of a 300 dpi or a 600 dpi. By this operation, as shown in FIG. 20, a 300 dpi and a 600 dpi will each have different potential, $V_{L300}$ and $V_{L600}$, on the surface of the photoconductor even though a base potential of $V_C$ is equivalent for both cases. On the basis of this result, it is obvious that image density varies in response to the change of the dot resolution even with the development bias $V_B$ maintained constant.

Figure 21:
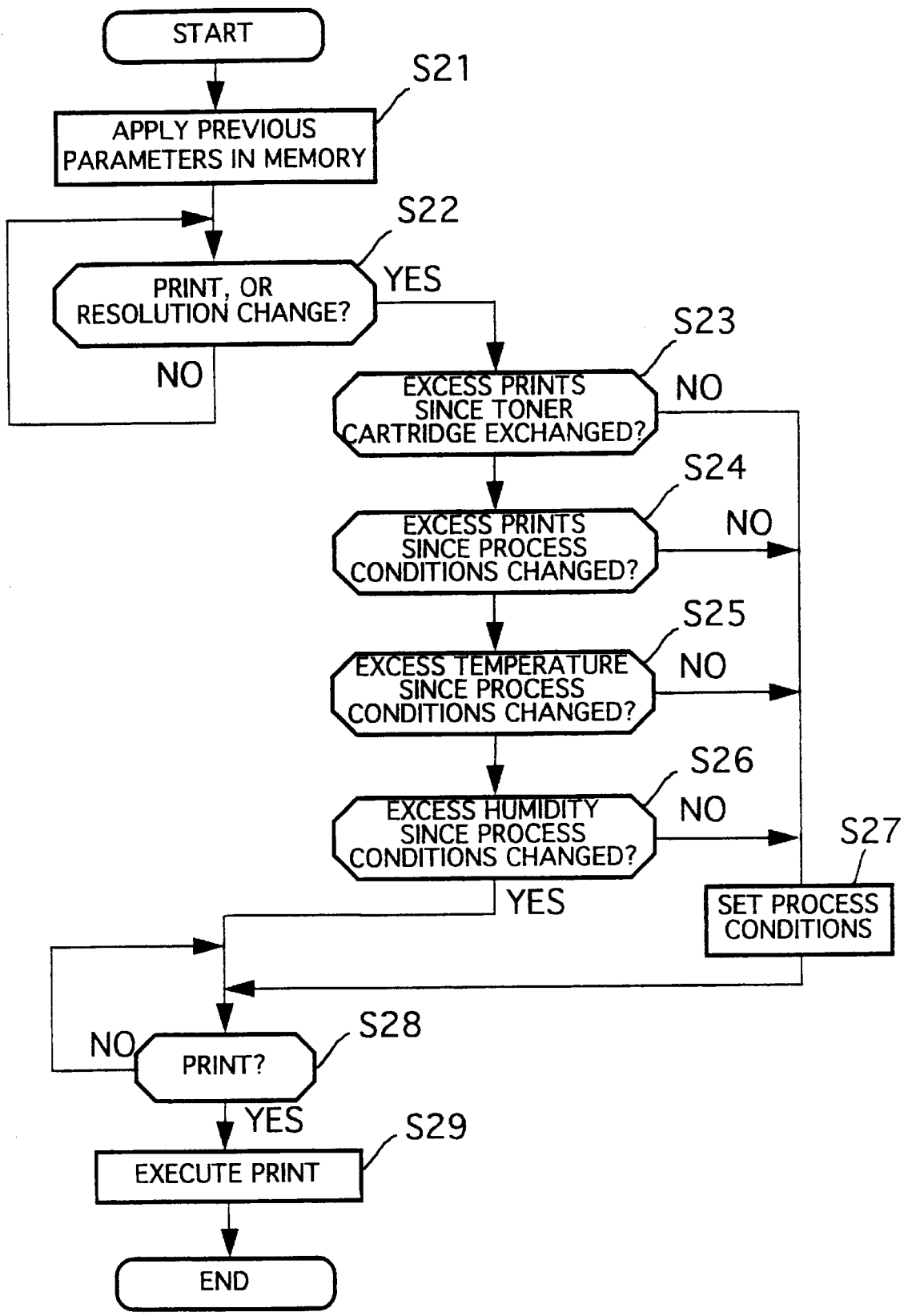
FIG. 21 is a flowchart for explaining an exemplary whole procedure of the color image forming apparatus.

Next, an outline of the whole procedure of automatic image density correction by changing the strength of a laser beam in accordance with a change of an optical writing condition such as image resolution is explained with respect to FIG. 21. The CPU 101, in Step S21, starts by setting the same conditions of the development potential and associated potentials as previously set under the image resolution then used, using the parameters which are stored in the memory. The CPU 101 then proceeds to Step S22, in which the CPU 101 checks whether or not a dot resolution change instruction or a print instruction is made. If NO, Step S22 is continuously performed until an affirmative response is given. If YES, the process proceeds to Step S23 in which the CPU 101 checks whether or not a number of prints exceeds a predetermined number since the previous exchange of the toner cartridge. If YES at Step S23, the process proceeds to a next step, or, if NO, the process proceeds to Step S27 in which the CPU 101 establishes the image forming process conditions. In Step S24, the CPU 101 checks whether or not a number of prints exceeds a predetermined number since the previous establishment of the image forming process conditions. If YES at Step S24, the process proceeds to the next step, or if NO, the process proceeds to Step S27. In Step S25, the CPU checks whether or not the temperature exceeds a predetermined limit since the previous establishment of the image forming process conditions. If YES at Step S25, the process proceeds to a next step, or, if NO, the process proceeds to Step S27. In Step S26, the CPU 101 checks whether or not a degree of humidity exceeds a predetermined limit since the previous establishment of the image forming process conditions. If YES at Step S26, the process proceeds to a next step, or, if NO, the process proceeds to Step S27. After Step S27, the process proceeds to Step S28 in which the CPU 101 waits for a print instruction. Upon detecting a print instruction in Step S28, the CPU 101 executes a print action in Step S29.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming apparatus, comprising:
   a recording medium;
   laser beam generating means for generating a laser beam during an optical writing operation and for writing a dot image on the recording medium;
   instruction buffering means for buffering an instruction sent by an operator for changing a condition of said optical writing operation and changing an appearance of the dot image on the recording medium;
   writing control means for controlling a plurality of conditions of said optical writing operation including at least one of a size of said dot image formed by said laser beam, a light strength of said laser beam, a mode of image resolution, and a scanning speed of said laser beam, in accordance with said instruction;
   process control means for determining a development potential and associated bias potentials both to be used in a process for forming said dot image in accordance with said instruction and a plurality of said conditions of said optical writing operation, and for storing data of said development potential and said associated bias potentials as data of current development and associated bias potentials, said determining of said development potential and associated bias potentials including generating a reference dot image, transferring said reference dot image to said laser beam generating means which develops said reference dot image with toner, measuring an image density of said developed reference dot image, and correcting said determined development potential and said associated bias potentials on the basis of said measured image density of said developed reference dot image; and
   system control means for determining a time when a plurality of said conditions of said optical writing operation are to be changed, upon detecting said instruction input from the instruction buffering means, for instructing said writing control means to change a plurality of said conditions of said optical writing operation, and also for instructing said process control means to determine said development potential and said associated bias potentials.

2. An image forming apparatus according to claim 1, wherein:
   said size of the dot image and said light strength of said laser beam are controlled in accordance with a strength of a driving current for generating said laser beam in said laser beam generating means.

3. An image forming apparatus according to claim 2, further comprising:
   storing means for storing data of predetermined values of different modes of said image resolution, and
   wherein said writing control means uses said predetermined values in response to instruction for changing the mode of said image density.

4. A laser recording apparatus according to claim 3, further comprising:
   first detecting means for detecting a condition of an environmental parameter proximate to said recording medium, and
   wherein said process control means determines said development potential and said associated bias potentials with reference to said condition of said environmental parameter detected by said first detecting means.

5. A laser recording apparatus according to claim 3, wherein said process control means determines in accordance with said data of said current development and associated bias potentials set at a time of starting up.

6. A laser recording apparatus according to claim 4, wherein said first detecting means detects a condition of said environmental parameter including at least one of temperature and humidity.

7. A laser recording apparatus according to claim 4, wherein said process control means determines in accordance with said data of said current development and associated bias potentials set at a time of starting up.

8. A laser recording apparatus according to claim 6, wherein said process control means determines in accordance with said data of said current development and associated bias potentials set at a time of starting up.

9. A laser recording apparatus according to claim 2, further comprising:
   first detecting means for detecting a condition of an environmental parameter proximate to said recording medium, and
   wherein said process control means determines said development potential and said associated bias potentials with reference to said condition of said environmental parameter detected by said first detecting means.

10. A laser recording apparatus according to claim 9, wherein said first detecting means comprises:
    means for detecting said environmental parameter which includes at least one of temperature and humidity.

11. A laser recording apparatus according to claim 9, wherein said process control means determines in accordance with said data of said current development and associated bias potentials set at a time of starting up.

12. A laser recording apparatus according to claim 10, wherein said process control means determines in accordance with said data of said current development and associated bias potentials set at a time of starting up.

13. A laser recording apparatus according to claim 2, wherein said process control means determines in accordance with said data of said current development and associated bias potentials set at a time of starting up.

14. An image forming apparatus according to claim 1, further comprising:
    storing means for storing data of predetermined values of different modes of said image resolution, and
    wherein said writing control means uses said predetermined values in response to instruction for changing the mode of said image density.

15. A laser recording apparatus according to claim 14, further comprising:
    first detecting means for detecting a condition of an environmental parameter proximate to said recording medium, and
    wherein said process control means determines said development potential and said associated bias potentials with reference to said condition of said environmental parameter detected by said first detecting means.

16. A laser recording apparatus according to claim 14, wherein said process control means determines in accordance with said data of said current development and associated bias potentials set at a time of starting up.

17. A laser recording apparatus according to claim 15, wherein said first detecting means detects a condition of said environmental parameter including at least one of temperature and humidity.

18. A laser recording apparatus according to claim 15, wherein said process control means determines in accordance with said data of said current development and associated bias potentials set at a time of starting up.

19. A laser recording apparatus according to claim 17, wherein said process control means determines in accordance with said data of said current development and associated bias potentials set at a time of starting up.

20. A laser recording apparatus according to claim 1, further comprising:
    first detecting means for detecting a condition of an environmental parameter proximate to said recording medium, and
    wherein said process control means determines said development potential and said associated bias potentials with reference to said condition of said environmental parameter detected by said first detecting means.

21. A laser recording apparatus according to claim 20, wherein said first detecting means comprises:
    means for detecting said environmental parameter which includes at least one of temperature and humidity.

22. A laser recording apparatus according to claim 20, wherein said process control means determines in accordance with said data of said current development and associated bias potentials set at a time of starting up.

23. A laser recording apparatus according to claim 21, wherein said process control means determines in accordance with said data of said current development and associated bias potentials set at a time of starting up.

24. A laser recording apparatus according to claim 1, further comprising:
    counting means for counting a number of printing times, and
    wherein said system control means instructs said process control means to use said data of said current development and associated bias potentials when said system control means detects an instruction for changing a mode of said image resolution during a time when said number of printing times is detected to be smaller than a predetermined number of printing times, and to determine said development potential and said associated bias potentials when said system control means detects an instruction for changing a mode of said image resolution during a time when said number of printing times which is detected exceeds said predetermined number of printing times.

25. A laser recording apparatus according to claim 24, further comprising:
    second detecting means for detecting a condition in which a toner cartridge is exchanged; and
    means for generating a detecting signal to initialize said counting means to restart a counting of said number of printing times, in response to a detection by the second detecting means.

26. A laser recording apparatus according to claim 24, wherein said process control means determines in accordance with said data of said current development and associated bias potentials set at a time of starting up.

27. A laser recording apparatus according to claim 25, wherein said process control means determines in accordance with said data of said current development and associated bias potentials set at a time of starting up.

28. A laser recording apparatus according to claim 1, wherein said process control means determines in accordance with said data of said current development and associated bias potentials set at a time of starting up.

* * * * *